United States Patent
Yazawa et al.

(10) Patent No.: US 8,366,321 B2
(45) Date of Patent: *Feb. 5, 2013

(54) BEARING UNIT, AND MOTOR AND ELECTRONIC APPARATUS HAVING BEARING UNIT

(75) Inventors: Kenichiro Yazawa, Tokyo (JP); Ichiro Koyanagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 774 days.

This patent is subject to a terminal disclaimer.

(21) Appl. No.: 12/139,004

(22) Filed: Jun. 13, 2008

(65) Prior Publication Data

US 2009/0010578 A1  Jan. 8, 2009

(30) Foreign Application Priority Data

Jul. 6, 2007  (JP) ................ 2007-178866

(51) Int. Cl.
*F16C 32/06* (2006.01)

(52) U.S. Cl. ........ 384/113; 384/100; 384/107; 384/120; 384/123

(58) Field of Classification Search .......... 384/100, 384/203–104, 107, 132, 215, 903, 113–114, 384/119–120, 123; 310/90
See application file for complete search history.

(56) References Cited

U.S. PATENT DOCUMENTS

| | | | | |
|---|---|---|---|---|
| 3,234,886 | A * | 2/1966 | Leff | 415/199.1 |
| 3,513,339 | A * | 5/1970 | Harris et al. | 310/90 |
| 3,553,511 | A * | 1/1971 | Hemmings et al. | 310/90 |
| 3,592,517 | A * | 7/1971 | Harris | 384/215 |
| 4,152,099 | A * | 5/1979 | Bingler | 310/104 |
| 4,387,315 | A * | 6/1983 | Barthruff et al. | 310/90 |
| 4,968,910 | A * | 11/1990 | Meier et al. | 384/903 |
| 5,363,003 | A * | 11/1994 | Harada et al. | 310/67 R |
| 5,920,137 | A * | 7/1999 | Sung et al. | 310/90 |
| 6,402,606 | B1 * | 6/2002 | Kusakabe et al. | 451/541 |
| 6,469,373 | B2 * | 10/2002 | Funakura et al. | 257/679 |
| 6,695,285 | B1 | 2/2004 | Hotton | |
| 6,832,853 | B2 * | 12/2004 | Fujinaka | 384/100 |
| 7,073,946 | B2 * | 7/2006 | Shishido et al. | 384/107 |

(Continued)

FOREIGN PATENT DOCUMENTS

| | | | |
|---|---|---|---|
| JP | 01006510 A | * | 1/1989 |
| JP | 1991 005134 | | 10/1991 |

(Continued)

OTHER PUBLICATIONS

Japanese Office Action dated Jun. 29, 2011 for Japanese Application No. 2007-178866.

*Primary Examiner* — Marcus Charles
(74) *Attorney, Agent, or Firm* — SNR Denton US LLP

(57) ABSTRACT

A bearing unit includes: a shaft; a radial bearing configured to support the shaft in a circumferential direction; a thrust bearing configured to support one end of the shaft in a thrust direction; a housing having the radial bearing and the thrust bearing disposed in the inside and having a closed structure except a shaft insertion hole into which the shaft is fitted; a coming out preventing member provided on one end side of the radial bearing at which the thrust bearing is provided configured to prevent the shaft from coming out from the radial bearing; and viscous fluid filled in the housing. The coming out preventing member is made of a resin material having a value of a Young's modulus equal to or higher than 3.4 GPa.

15 Claims, 8 Drawing Sheets

U.S. PATENT DOCUMENTS

| | | | |
|---|---|---|---|
| 7,258,487 B2 * | 8/2007 | Yazawa et al. | 384/100 |
| 7,258,488 B2 * | 8/2007 | Shih et al. | 384/119 |
| 7,438,475 B2 * | 10/2008 | Yazawa et al. | 384/107 |
| 7,527,431 B2 * | 5/2009 | Kakinuma et al. | 384/100 |
| 7,605,908 B2 * | 10/2009 | Ito et al. | 355/78 |
| 7,699,527 B2 * | 4/2010 | Komori et al. | 384/100 |
| 2005/0048347 A1 * | 3/2005 | Takashita et al. | 429/34 |
| 2005/0163405 A1 * | 7/2005 | Yazawa et al. | 384/100 |
| 2005/0220378 A1 * | 10/2005 | Kaneko et al. | 384/100 |
| 2006/0251348 A1 * | 11/2006 | Egami et al. | 384/58 |
| 2007/0058891 A1 * | 3/2007 | Hong et al. | 384/107 |
| 2007/0075435 A1 * | 4/2007 | Suminoe et al. | 257/777 |
| 2008/0073780 A1 * | 3/2008 | Imori | 257/729 |
| 2008/0236307 A1 * | 10/2008 | Watanabe et al. | 73/865.8 |

FOREIGN PATENT DOCUMENTS

| | | |
|---|---|---|
| JP | 1994 213222 | 8/1994 |
| JP | 2007 006687 | 1/2001 |
| JP | 2003 284283 | 3/2003 |
| JP | 2003 515078 | 4/2003 |
| JP | 2004 301232 | 10/2004 |
| JP | 2005-147265 | 6/2005 |
| JP | 2005 147266 | 6/2005 |
| JP | 2006 181784 | 7/2006 |
| JP | 2008120985 A * | 5/2008 |
| WO | WO 9808892 A1 * | 3/1998 |

* cited by examiner

F I G . 3
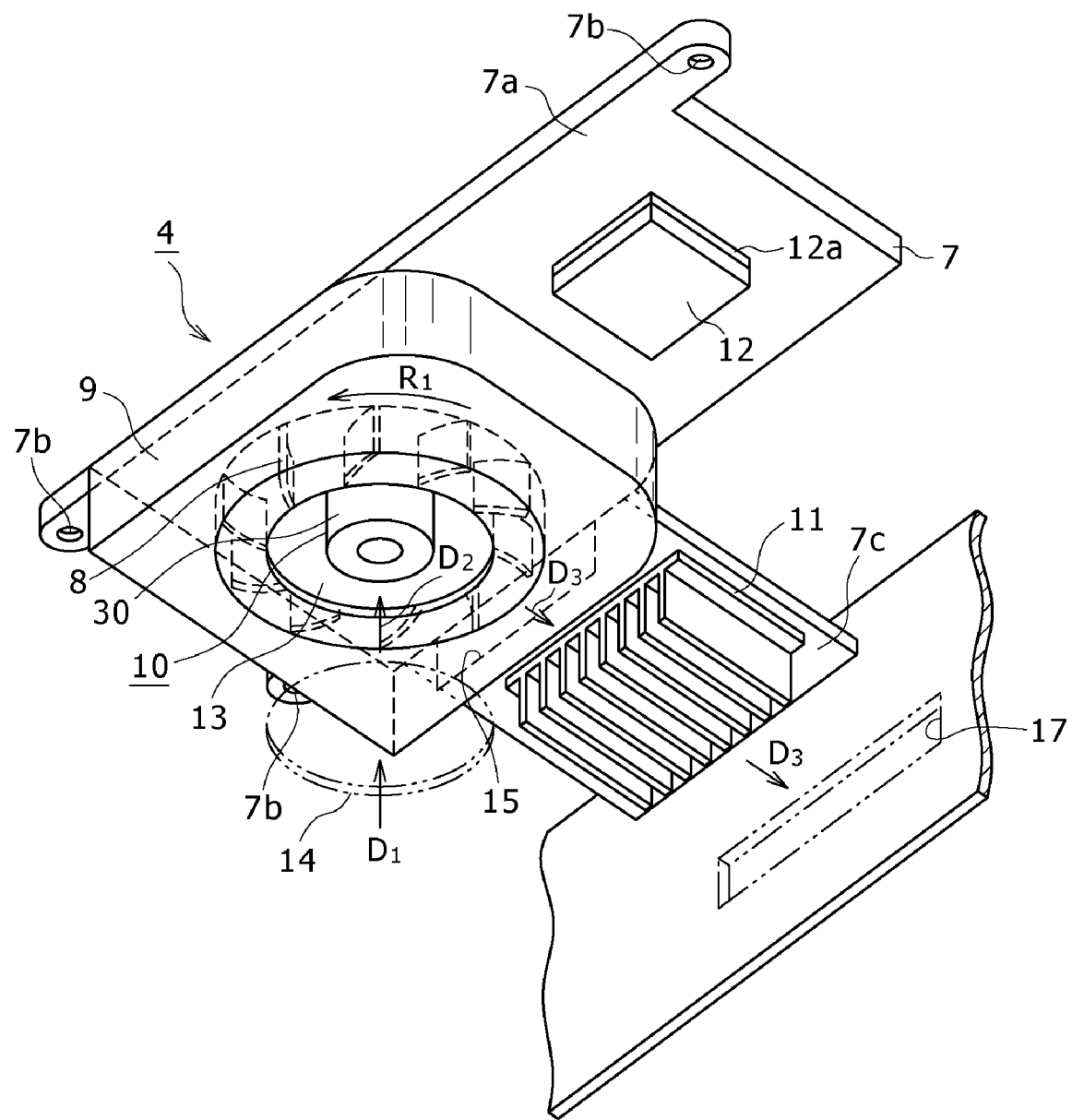

BEARING UNIT, AND MOTOR AND ELECTRONIC APPARATUS HAVING BEARING UNIT

CROSS REFERENCES TO RELATED APPLICATIONS

The present invention contains subject matter related to Japanese Patent Application JP 2007-178866 filed with the Japan Patent Office on Jul. 6, 2007, the entire contents of which being incorporated herein by reference.

BACKGROUND OF THE INVENTION

1. Field of the Invention

This invention relates to a bearing unit which supports a rotary shaft for rotation thereon or supports a rotatable member for rotation on a shaft, and a motor and an electronic apparatus which have a bearing unit.

2. Description of the Related Art

Various bearing units for supporting a rotary shaft for rotation thereon are known in the past, and an exemplary one of such bearing units is disclosed in Japanese Patent Laid-Open No. 2005-147265 and is shown in FIG. 10.

Referring to FIG. 10, the bearing unit 100 shown supports a rotary shaft 101 for rotation thereon and includes a radial bearing 104 for supporting the rotary shaft 101 in a circumferential direction and a housing 105 which accommodates the radial bearing 104 therein.

In the bearing unit 100, the radial bearing 104 cooperates with lubricating oil as viscous fluid filled in the housing 105 to form a dynamic fluid bearing. Dynamic pressure generating grooves 111 for generating a dynamic pressure are formed on an inner circumferential face of the radial bearing 104 in which the rotary shaft 101 is fitted.

The housing 105 in which the radial bearing 104 which supports the rotary shaft 101 is accommodated is one member which is formed by integral molding of a synthetic resin material and has such a shape that it accommodates and surrounds the radial bearing 104 formed in a cylindrical shape as seen in FIG. 10.

The housing 105 includes a cylindrical housing body 106, and a bottom closing portion 107 formed integrally with the housing body 106 in such a manner as to close up one end side of the housing body 106 and forming a one-end side portion. An upper closing member 108 is provided on the other end side of the housing body 106 which is open. The housing 105 and the upper closing member 108 are integrated with each other using such a technique as heat sealing or ultrasonic sealing.

The upper closing member 108 has a shaft fitting hole 109 formed at a central portion thereof. The rotary shaft 101 supported for rotation on the radial bearing 104 accommodated in the housing 105 is fitted in the shaft fitting hole 109.

The shaft fitting hole 109 is formed with an inner diameter a little greater than the outer profile of a shaft body 103 so that the rotary shaft 101 fitted in the shaft fitting hole 109 may rotate without slidably contacting with an inner circumferential face of the shaft fitting hole 109. The shaft fitting hole 109 is formed such that an air gap 112 of a distance sufficient to prevent leakage of lubricating oil 113 filled in the housing 105 from within the housing 105 is formed between an inner circumferential face of the shaft fitting hole 109 and an outer circumferential face of the shaft body 103.

Further, a thrust bearing 110 is formed integrally at a central portion of the inner face side of the bottom closing portion 107. The thrust bearing 110 supports a bearing support portion 102, which is provided at the one end portion in a thrust direction of the rotary shaft 101 supported on the radial bearing 104, for rotation thereon.

The thrust bearing 110 is formed as a pivot bearing for supporting the bearing support portion 102, which is formed in an arcuate shape or in a tapering shape, of the rotary shaft 101 at a point.

A coming out preventing member 115 in the form of a washer or the like is provided between the bearing support portion 102 and the shaft body 103. The coming out preventing member 115 has an inner diametrical dimension smaller than the dimension of an outer diameter of the rotary shaft 101 and is disposed in a grooved portion 116 provided at an end portion of the rotary shaft 101. When the rotary shaft 101 is moved in a coming out direction, a lower edge of the grooved portion 116 of the rotary shaft 101 is contacted and interferes with the coming out preventing member 115 so that the rotary shaft 101 is prevented from coming out and dropping from the housing 105 by the coming out preventing member 115.

A gap Y3 for preventing the coming out preventing member 115 from disturbing rotation of the rotary shaft 101 is provided between an outer circumference of the grooved portion 116 of the rotary shaft 101 and an inner circumference of the coming out preventing member 115. Meanwhile, another gap X4 is provided between an end face which defines the lower edge of the grooved portion 116 and a bottom face of the coming out preventing member 115, and a further gap X5 is provided between an end face which defines an upper edge of the grooved portion 116 and an upper face of the coming out preventing member 115.

The bearing unit 100 having such a configuration as described above with reference to FIG. 10 can prevent the rotary shaft 101 from coming out from the housing 105 by means of the coming out preventing member 115 configured in such a manner as described above.

Incidentally, for example, a rotor assembly not shown is attached to an upper portion of the rotary shaft 101. Thus, when the rotary shaft 101 moves in the coming out direction, the weight of the rotor assembly acts as a load upon the coming out preventing member 115. Particularly when an impact is applied, since an increased load of several tens times the load of the rotor assembly is applied to the coming out preventing member 115, high strength is demanded for the coming out preventing member 115 described above. In other words, strength sufficient to prevent the rotary shaft 101 from coming out is demanded for the coming out preventing member 115. Such strength is hereinafter referred to as coming out preventing force.

As a countermeasure for increasing the coming out preventing force, that is, the coming out withstanding force, of the coming out preventing member 115, a method of increasing the thickness of the coming out preventing member 115 in the axial direction, another method of decreasing the inner diametrical dimension of the coming out preventing member 115 to increase the contact area between the coming out preventing member 115 and the grooved portion 116 of the rotary shaft 101 to increase the meshing engagement between them and a like method seem applicable. However, since the coming out preventing member 115 is attached to the grooved portion 116 of the rotary shaft 101 such that the coming out preventing member 115 is resiliently deformed into an umbrella shape and inserted into and attached to the grooved portion 116, whereupon the coming out preventing member 115 restores its original shape, where the coming out preventing force or coming out resisting force is increased by any of such methods as described above, it is necessary to increase the gap X4 between the lower edge of the grooved portion 116 and the coming out preventing member 115. Then, if the gap X4 is not provided with a necessary dimension, then the coming out preventing member 115 is placed into and remains in a state wherein it is caught by an end portion of the rotary shaft 101 and deteriorates the rotational performance of the rotary shaft 101, resulting in the possibility that such a problem that the rotary shaft 101 does not rotate or rotates but abnormally may occur. On the other hand, increase of the size of the gap X4 may cause another problem that the dimension of the bearing unit 100 in the axial direction increases or that the rotary shaft 101 floats in the coming out direction to allow air to be admitted into the lubricating oil 113.

Also a method of selecting a metal material having a high breaking strength as the material of the coming out preventing member 115 in order to increase the coming out preventing force or coming out withstanding force of the coming out preventing member 115 seems applicable. However, when the coming out preventing member 115 is attached to the rotary shaft 101, there is the possibility that plastic deformation may occur with the coming out preventing member 115, resulting in a problem that the rotational performance of the rotary shaft 101 is damaged similarly.

SUMMARY OF THE INVENTION

Therefore, it is demanded to provide a bearing unit and a motor and an electronic apparatus including a bearing unit wherein the coming out preventing force when an impact is applied is increased and the size of a grooved portion of a shaft in an axial direction for disposing a coming out preventing member therein can be suppressed to decrease the dimension in the axial direction of the entire bearing unit and the entire apparatus in which the bearing unit is incorporated thereby to miniaturize the bearing unit and the apparatus.

According to an embodiment of the present invention, there is provided a bearing unit including a shaft, a radial bearing configured to support the shaft in a circumferential direction, a thrust bearing configured to support one end of the shaft in a thrust direction, a housing having the radial bearing and the thrust bearing disposed in the inside and having a closed structure except a shaft insertion hole into which the shaft is fitted, a coming out preventing member provided on one end side of the radial bearing at which the thrust bearing is provided configured to prevent the shaft from coming out from the radial bearing, and viscous fluid filled in the housing. The coming out preventing member is made of a resin material having a value of a Young's modulus equal to or higher than 3.4 GPa.

According to another embodiment of the present invention, there is provided a motor including a stator, a rotor, and a bearing unit configured to support the rotor for rotation on the stator. The bearing unit includes a shaft, a radial bearing configured to support the shaft in a circumferential direction, a thrust bearing configured to support one end of the shaft in a thrust direction, a housing having the radial bearing and the thrust bearing disposed in the inside and having a closed structure except a shaft insertion hole into which the shaft is fitted, a coming out preventing member provided on one end side of the radial bearing at which the thrust bearing is provided configured to prevent the shaft from coming out from the radial bearing, and viscous fluid filled in the housing. The coming out preventing member is made of a resin material having a value of a Young's modulus equal to or higher than 3.4 GPa.

According to a further embodiment of the present invention, there is provided an electronic apparatus including a motor including a stator, a rotor, and a bearing unit configured to support the rotor for rotation on the stator. The bearing unit includes a shaft, a radial bearing configured to support the shaft in a circumferential direction, a thrust bearing configured to support one end of the shaft in a thrust direction, a housing having the radial bearing and the thrust bearing disposed in the inside and having a closed structure except a shaft insertion hole into which the shaft is fitted, a coming out preventing member provided on one end side of the radial bearing at which the thrust bearing is provided configured to prevent the shaft from coming out from the radial bearing, and viscous fluid filled in the housing. The coming out preventing member is made of a resin material having a value of a Young's modulus equal to or higher than 3.4 GPa.

With the bearing unit, motor and electronic apparatus, since the coming out preventing member for preventing the shaft from coming out is formed from a resin material having a Young's modulus of a value equal to or higher than 3.4 GPa, the coming out preventing force is improved. Further, the size, in the axial direction, of a grooved portion of the shaft for disposing the coming out preventing member can be suppressed to implement miniaturization. Further, the gap between an end face of the grooved portion of the shaft and an end face of the coming out preventing member can be reduced to implement reduction of the movement of the shaft in the upward and downward directions.

BRIEF DESCRIPTION OF THE DRAWINGS

FIG. 3 is a perspective view showing a radiator apparatus which incorporates a motor to which the present embodiment is applied;

DETAILED DESCRIPTION OF THE PREFERRED EMBODIMENT

Figure 1:
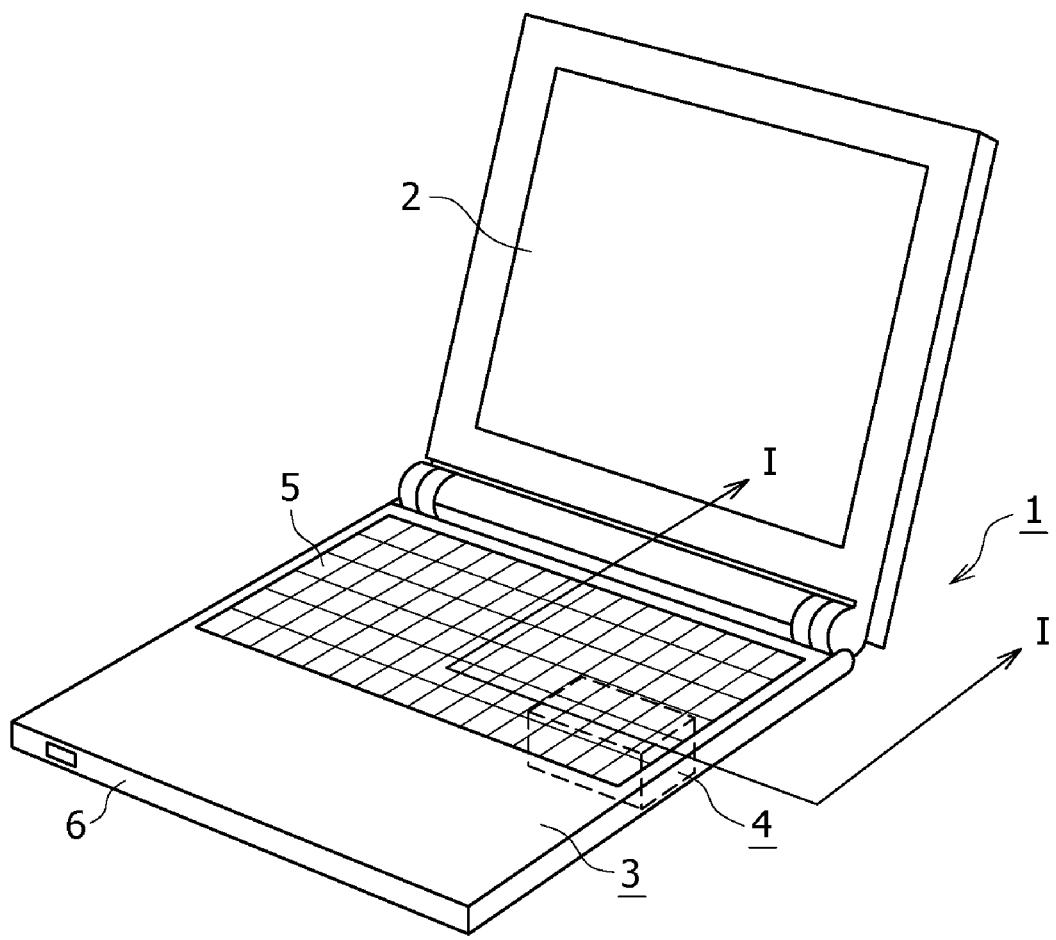
FIG. 1 is a perspective view showing an information processing apparatus to which the present embodiment is applied.

Referring to FIG. 1, there is shown an information processing apparatus to which an embodiment of the present invention is applied. The information processing apparatus shown is a notebook type personal computer and includes a display section 2 for displaying a result of information processing and so forth and a computer body 3 which includes a built-in information processing section which carries out mathematical operation processing of various kinds of information. A keyboard 5 for inputting an operation information for the computer 1 or for inputting various kinds of information is provided on an upper face of the computer body 3, and a radiator apparatus 4 is provided in the inside of the keyboard 5. The radiator apparatus 4 functions as a cooling apparatus which radiates heat generated from the information processing apparatus such as a CPU, a disk apparatus and so forth disposed in the inside of the computer body 3 to the outside of the computer body 3 to cool the inside of the computer body 3.

Figure 2:
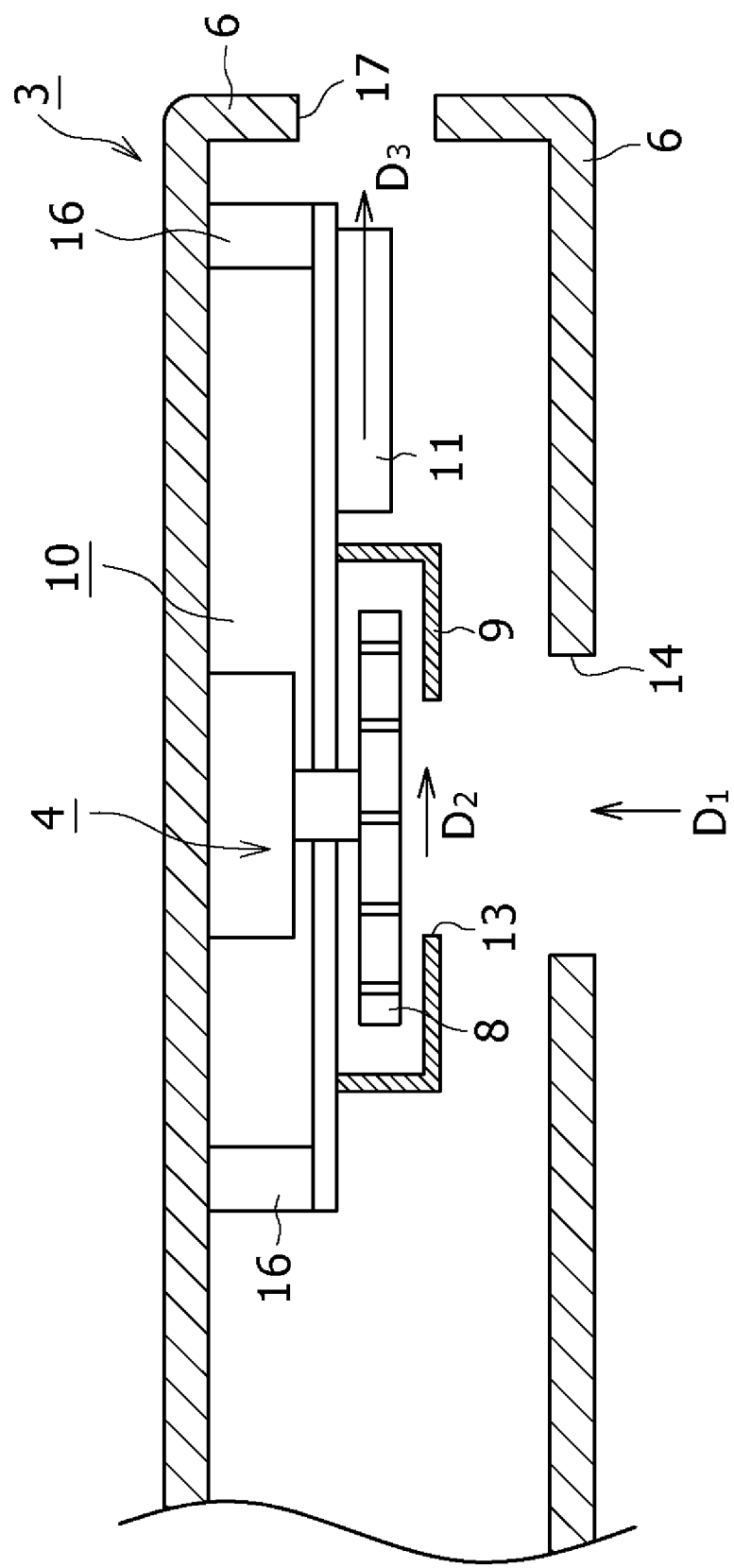
FIG. 2 is a sectional view taken along line I-I of FIG. 1.

Referring now to FIG. 2, the radiator apparatus 4 built in the computer body 3 is accommodated in a housing 6 which forms the computer body 3. Referring also to FIG. 3, the radiator apparatus 4 includes a base 7 made of a metal material, a motor 10 attached to the base 7, a fan 8 driven to rotate by the motor 10, a fan case 9 in which the fan 8 is accommodated, and a heat sink 11.

The base 7 is formed substantially in an L shape as seen in FIG. 3. A heat generating element 12 which is driven by energization thereof like a CPU (Central Processing Unit) is attached to the base 7 on one end side of the base 7 of the substantially L shape. The heat generating element 12 is attached to a face 7a of the base 7 through a heat transmitting seal 12a.

The motor 10 is attached to a substantially central portion of the face 7a of the base 7, and also the fan case 9 which accommodates the fan 8 which is driven to rotate by the motor 10 is attached to the face 7a. A circular inlet opening 13 is provided in the fan case 9 and opens a position corresponding to a central portion of the fan 8 rotated by the motor 10. An opening 14 is formed at a position of the face 7a opposing to the inlet opening 13 formed in the fan case 9 on the bottom base side of the housing 6 such that it communicates with the inlet opening 13. Further, an exhaust opening 15 for exhausting air sucked in through the inlet opening 13 to the outside therethrough is provided in the fan case 9.

The heat sink 11 is secured to the face 7a of the base 7 on the other end side. The heat sink 11 may be of the corrugation type or the fin type and is made of a metal material having a superior heat radiation property such as, for example, aluminum. Also the base 7 and the fan case 9 are preferably made of a metal material having a superior heat radiation property such as aluminum or iron.

On the base 7 to which the heat generating element 12 is attached and also the radiator apparatus 4 and the heat sink 11 for radiating heat generated from the heat generating element 12 are attached, a plurality of mounting holes 7b are provided such that screws which are used to attach the base 7 in the housing 6 are screwed therein. The base 7 is attached in the housing 6 by securing the fastening screws inserted in the mounting holes 7b to bosses 16 provided in the inside of the housing 6 as seen in FIG. 2.

When the base 7 is attached in the housing 6, the heat sink 11 is disposed at a position at which it is opposed to a through-opening 17 formed in a side wall of the housing 6 as seen in FIGS. 2 and 3.

If the motor 10 is driven to rotate the fan 8 in the direction indicated by an arrow mark R1 in FIG. 3, then the radiator apparatus 4 configured in such a manner as described above sucks external air of the computer 1 through the opening 14 formed in the housing 6 in the direction indicated by an arrow mark D1 in FIGS. 2 and 3 and further sucks the air into the fan case 9 through the inlet opening 13. The air sucked in the fan case 9 by rotation of the fan 8 flows in the direction indicated by an arrow mark D2 in FIGS. 2 and 3 and then flows in the direction indicated by another arrow mark D2 in FIGS. 2 and 3 such that it flows through the heat sink 11. Thereafter the air is exhausted to the outside of the housing 6 through the through-opening 17.

Incidentally, heat generated from the heat generating element 12 attached to the base 7 when the heat generating element 12 is driven is transmitted to the heat sink 11 attached to the base 7 through the base 7 formed from a metal material having a superior heat radiation property. At this time, the fan 8 of the radiator apparatus 4 is rotated by the motor 10, and the air sucked in from the outside of the housing 6 flows between the fins of the heat sink 11 and radiates the heat transmitted to the heat sink 11 to the outside of the housing 6 through the through-opening 17.

Figure 4:
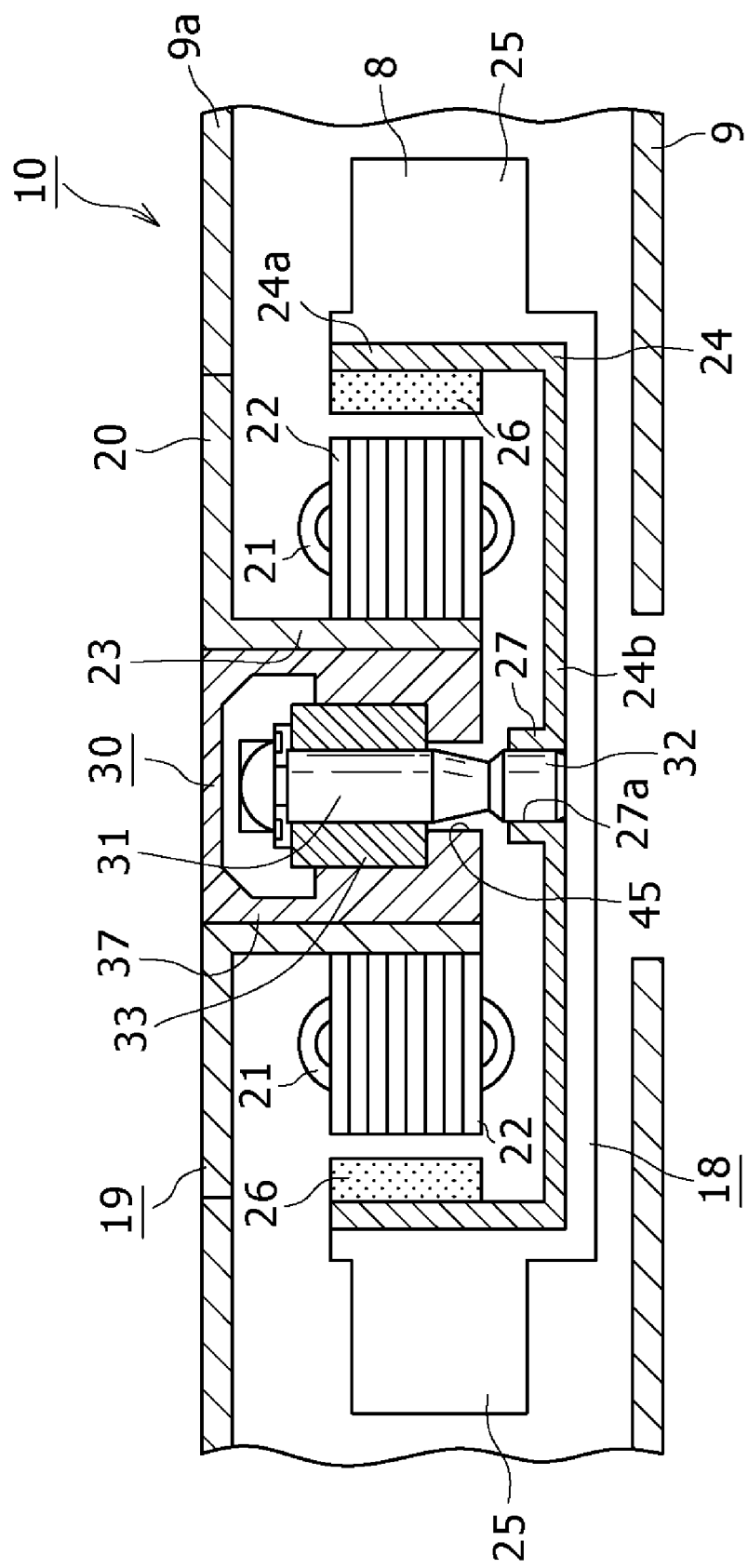
FIG. 4 is a sectional view showing a configuration of the motor shown in FIG. 3.

The motor 10 which is used in the radiation apparatus described above and to which the present invention is applied is shown in FIG. 4. Referring to FIG. 4, the motor 10 includes a rotor 18 and a stator 19.

The stator 19 is provided integrally on a top plate 9a side of the fan case 9 in which the fan 8 which is rotated by the motor 10 is accommodated together with the motor 10. The stator 19 includes a stator yoke 20, a bearing unit 30 to which the present invention is applied, a coil 21, and a core 22 on which the coil 21 is wound. The stator yoke 20 may be formed integrally with the top plate 9a of the fan case 9, that is, formed from part of the fan case 9, or may be formed as a separate member from the fan case 9. The stator yoke 20 is formed, for example, from iron. The bearing unit 30 is secured by force fitting or adhesion or else by force fitting and adhesion into and to a holder 23 formed cylindrically at a central portion of the stator yoke 20.

It is to be noted that the holder 23 into which the bearing unit 30 is force fitted is formed cylindrically integrally with the stator yoke 20.

The core 22 on which the coil 21 to which driving current is wound is attached as seen in FIG. 4 is provided on an outer periphery of the holder 23 formed integrally with the stator yoke 20.

The rotor 18 which cooperates with the stator 19 to form the motor 10 is attached to a rotary shaft 31 supported for rotation on the bearing unit 30 and rotates integrally with the rotary shaft 31. The rotor 18 includes a rotor yoke 24, and a plurality of blades 25 which rotate together with the rotor yoke 24. The blades 25 of the fan 8 are formed integrally with the rotor yoke 24 on an outer circumferential face of the rotor yoke 24 by outsert molding.

A ring-shaped rotor magnet 26 is provided on an inner circumferential face of a cylindrical portion 24a of the rotor yoke 24 in an opposing relationship to the coil 21 of the stator 19. The rotor magnet 26 is a plastic magnet magnetized alternately with S poles and N poles in a circumferential direction, and is secured to the inner circumferential face of the rotor yoke 24 by a bonding agent.

The rotor yoke 24 is attached for integral rotation with the rotary shaft 31 such that a boss plate 27 provided at a central portion of a flat plate portion 24b thereof and having a through-hole 27a provided therein is force fitted into an mounting portion 32 provided on an end side of the rotary shaft 31 supported on the bearing unit 30.

In the motor 10 having such a configuration as described above, if driving current is supplied in a predetermined energization pattern from a driving circuit section provided externally of the motor 10 to the coil 21 on the stator 19 side, then the rotor 18 is rotated integrally with the rotary shaft 31 by action between a magnetic field generated by the coil 21 and another magnetic field from the rotor magnet 26 on the rotor 18 side. As the rotor 18 rotates, also the fan 8 having the blades 25 attached to the rotor 18 rotates integrally with the rotor 18. As the fan 8 is rotated, air outside of the computer 1 is sucked in the direction indicated by an arrow mark D1 in FIGS. 2 and 3 through the opening 14 formed in the housing 6 and then flows in the direction indicated by an arrow mark D2. Thereafter, the air flows through the heat sink 11 and is then exhausted to the outside through the through-opening 17 to radiate heat generated from the heat generating element 12 to the outside of the computer body 3 thereby to cool the inside of the computer body 3.

Figure 5:
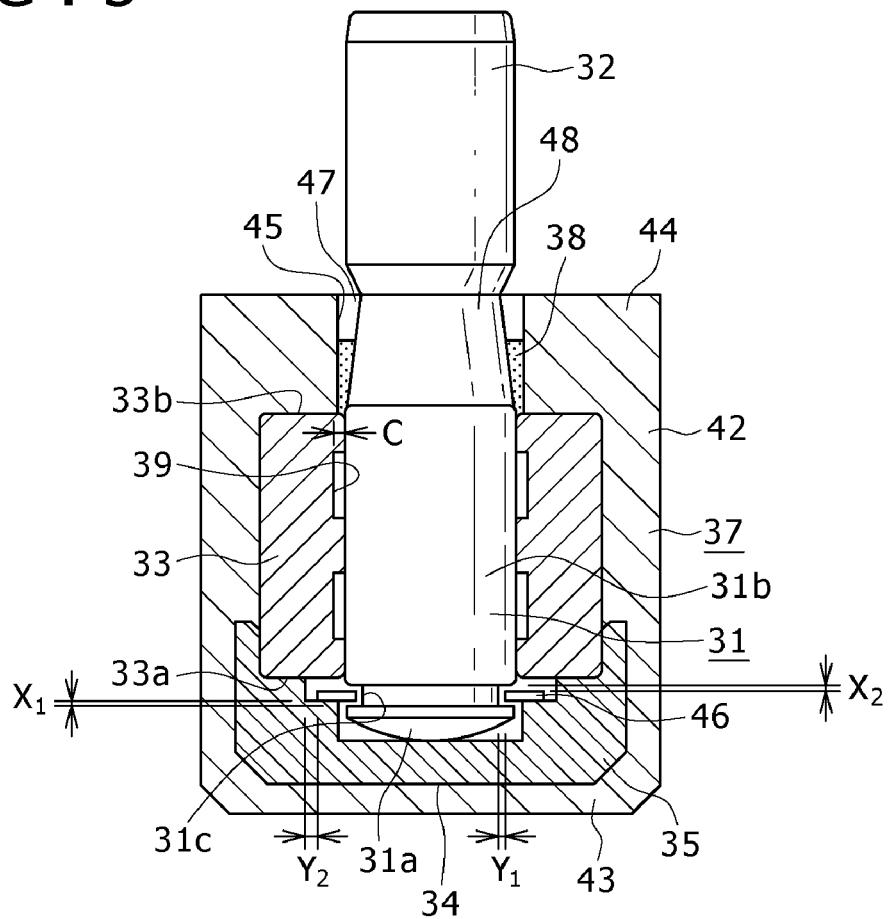
FIG. 5 is a sectional view showing a bearing unit to which the present embodiment is applied.

The bearing unit 30 which supports the rotary shaft 31 of the motor 10 for rotation includes, as seen in FIGS. 4 and 5, a space forming member 35 wherein a radial bearing 33 which supports the rotary shaft 31 in a circumferential direction and a thrust bearing 34 which supports one end of the rotary shaft 31 in a thrust direction are formed integrally. The bearing unit 30 further includes a housing 37 which accommodates the radial bearing 33 and the space forming member 35 therein.

The radial bearing 33 is formed cylindrically from sintered metal. The radial bearing 33 cooperates with lubricating oil 38 as viscous fluid filled in the housing 37 to form a dynamic pressure fluid bearing. A dynamic pressure generating groove 39 is formed on an inner circumferential face of the radial bearing 33 in which the rotary shaft 31 is fitted.

Figure 6:
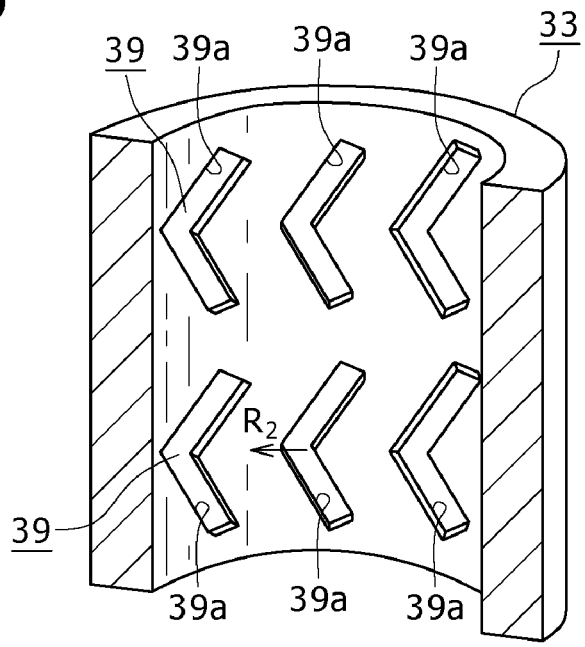
FIG. 6 is a perspective view showing dynamic pressure generating grooves formed on an inner circumferential face of a radial bearing of the bearing unit of FIG. 5.

The dynamic pressure generating groove 39 includes a plurality of pairs of V-shaped grooves 39a formed in a circumferential direction on an inner circumferential face of the radial bearing 33 as seen in FIG. 6. The dynamic pressure generating groove 39 is formed such that the end side of each pair of grooves 39a which form a V shape is directed in a rotation direction R2 of the rotary shaft 31. The number and size of the dynamic pressure generating grooves provided on the radial bearing 33 are suitably selected based on the magnitude, length and so forth of the radial bearing 33. It is to be noted that the radial bearing 33 may be formed from brass, stainless steel or a high-molecular material. Further, while a plurality of dynamic pressure generating grooves are formed in V-shaped arrangement, the arrangement of the dynamic pressure generation grooves is not limited to this. In particular, a plurality of grooves may be formed in herring-bone shape arrangement on the inner circumferential face of the radial bearing 33 such that they are connected to each other by a connecting groove in a circumferential direction.

It is to be noted here that, while the radial bearing 33 is formed as a dynamic pressure fluid bearing having dynamic pressure generating grooves, the radial bearing which forms a bearing unit to which the present invention is applied is not limited to this. In particular, any radial bearing may be used only if it supports the rotary shaft 31 in a circumferential direction, and, for example, a plain bearing, a sintered oilless bearing or the like may be used.

In the radial bearing 33 formed as a dynamic pressure fluid bearing, if the rotary shaft 31 fitted in the radial bearing 33 continuously rotates in the direction indicated by an arrow mark R2 in FIG. 6 around a center axis CL, then the lubricating oil 38 filled in the housing 37 circulates in the dynamic pressure generating groove 39 so that a dynamic pressure is generated between the outer circumferential face of the rotary shaft 31 and the inner circumferential face of the radial bearing 33 to support the rotating rotary shaft 31. The dynamic pressure at this time decreases the coefficient of friction between the rotary shaft 31 and the radial bearing 33 to a very low level thereby to implement smooth rotation of the rotary shaft 31.

The space forming member 35 provided on one end side of the rotary shaft 31 in a thrust direction is formed in such a manner as to surround a lower portion of the rotary shaft 31, that is, one end of the rotary shaft 31 on the closed side and is formed, for example, from a synthetic resin material. The lubricating oil is filled around a bearing support portion 31a of the rotary shaft 31 on the inner side of the space forming member 35.

The thrust bearing 34 is formed integrally at a central portion of the inner face side of the bottom of the space forming member 35 and supports the bearing support portion 31a, which is provided on one end side in a thrust direction of the rotary shaft 31 supported on the radial bearing 33, for rotation. The space forming member 35 is formed from a resin material and used commonly as the thrust bearing 34. The thrust bearing 34 is formed as a pivot bearing which supports the bearing support portion 31a of the rotary shaft 31, formed arcuately or in a tapering shape, at a point.

It is to be noted that, while it is described above that the space forming member 35 is made of a resin material, it may otherwise be made of a metal material or otherwise of a combination of a resin material and a metal material, and there is no limitation to the material of the space forming member 35. For example, the resin material which may be used for the space forming member 35 may be a fluorocarbon based synthetic resin material such as polyimide, polyamide or polyacetal, another synthetic resin material such as polytetrafluoroethylene (Teflon (registered trademark)) or nylon or a further synthetic resin material such as ABS (acrylonitrile-butadiene-styrene).

The housing 37 which accommodates the radial bearing 33 and the space forming member 35 is a single member which is formed by integral molding of a synthetic resin material and has such a shape that it contains and surrounds the radial bearing 33 and the space forming member 35 as seen in FIG. 5.

Referring to FIG. 5, the housing 37 includes a housing body 42 having a cylindrical shape, a bottom closing portion 43 formed integrally with the housing body 42 so as to close up one end side of the housing body 42 and forming a one-end side portion of the housing body 42, and an upper closing portion 44 formed integrally with the housing body 42 and forming the other end portion side of the housing body 42. A shaft fitting hole 45 is formed at a central portion of the upper closing portion 44, and the rotary shaft 31 supported for rotation on the radial bearing 33 accommodated in the housing 37 is fitted in the shaft fitting hole 45.

In the housing 37 having the configuration described above, the radial bearing 33 and the space forming member 35 are disposed and formed integrally on the inner circumference side of the housing body 42 by outsert molding of a synthetic resin material in such a manner as to wrap the radial bearing 33 and the space forming member 35.

Although the synthetic resin material used to form the housing 37 is not limited particularly, it is preferable to use a material which provides a comparatively large contact angle with the lubricating oil 38 filled in the housing 37 at which the lubricating oil 38 is repelled. Further, it is preferable to use a synthetic resin material which is superior in lubricity for the housing 37. Although the housing 37 is made of, for example, POM (polyoxymethylene), it may otherwise be formed using a fluorocarbon based synthetic resin material such as polyimide, polyamide or polyacetal, another synthetic resin material such as polytetrafluoroethylene (Teflon (registered trademark)) or nylon or a further synthetic resin material such as ABS (acrylonitrile-butadiene-styrene). Further, the housing 37 is made of liquid crystal polymer which allows molding with a very high degree of accuracy.

It is to be noted that, while the housing 37 in the bearing unit 30 described above is formed by integral molding of a resin material, the housing which composes the bearing unit to which the present invention is applied is not limited to this. In particular, the housing 37 may be formed otherwise such that members which form side portions and a bottom closing portion of a housing and a member which forms an upper closing portion of the housing are each formed from a metal material and integrated with each other by fusion or the like.

The rotary shaft 31 supported for rotation by the radial bearing 33 disposed in the housing 37 and the thrust bearing 34 provided integrally with the radial bearing 33 has the bearing support portion 31a formed arcuately or in a tapering shape and supported by the thrust bearing 34 of a shaft body 31b while the mounting portion 32 to which, for example, the rotor 18 of the motor 10 which is a rotary member is attached is provided on the other end side of the rotary shaft 31. Here, the shaft body 31b and the mounting portion 32 are formed with an equal diameter.

As seen in FIG. 5, the rotary shaft 31 is supported at the bearing support portion 31a on the one end side thereof by the thrust bearing 34 and at the outer circumferential face of the shaft body 31b thereof by the radial bearing 33. The mounting portion 32 side provided on the other end side of the rotary shaft 31 projects from the shaft fitting hole 45 provided in the upper closing portion 44 of the housing body 42 and is supported by the housing 37.

Meanwhile, a shaft coming out preventing grooved portion 31c for preventing coming out of the rotary shaft 31 is provided on the rotary shaft 31 between the bearing support portion 31a and the shaft body 31b. A shaft coming out preventing member 46 such as a washer is provided on the space forming member 35 in a corresponding relationship with the shaft coming out preventing grooved portion 31c. By engagement between the shaft coming out preventing grooved portion 31c and the shaft coming out preventing member 46, handling upon assembly is improved.

The shaft coming out preventing member 46 is made of a resin material having a Young's modulus of a value equal to or higher than 3.4 GPa, and polyimide (PI) or polyetheretherketone (PEEK) is used as a resin material for the shaft coming out preventing member 46. In particular, for example, polyimide having a Young's modulus of 6.7 GPa is used for the shaft coming out preventing member 46.

The shaft coming out preventing member 46 is dimensioned such that gaps Y2 and Y1 may be provided between the space forming member 35 and the shaft coming out preventing member 46 and between the shaft coming out preventing member 46 and the rotary shaft 31, respectively, in order to maintain the rotational performance of the rotary shaft 31.

Further, the shaft coming out preventing member 46 and the rotary shaft 31 are formed such that predetermined gaps X1 and X2 are provided on the upper side and the lower side of the shaft coming out preventing member 46, respectively, when the shaft coming out preventing member 46 is attached to the shaft coming out preventing grooved portion 31c of the rotary shaft 31. In particular, the predetermined gap X1 is formed between a face of the shaft coming out preventing member 46 on the thrust bearing 34 side which is the bottom face side and a lower side end face of the shaft coming out preventing grooved portion 31c. Meanwhile, the predetermined gap X2 is formed between a face of the shaft coming out preventing member 46 on the shaft opening side which is the upper face side and an upper side end face of the shaft coming out preventing grooved portion 31c. The gaps X1 and X2 are provided in such a degree as to prevent deterioration of the rotational performance of the rotary shaft 31 by contact of the shaft coming out preventing member 46 with the shaft coming out preventing grooved portion 31c of the rotary shaft 31 and are determined taking a dimension necessary for assembly of the shaft coming out preventing member 46 into consideration as hereinafter described.

Figure 7A:
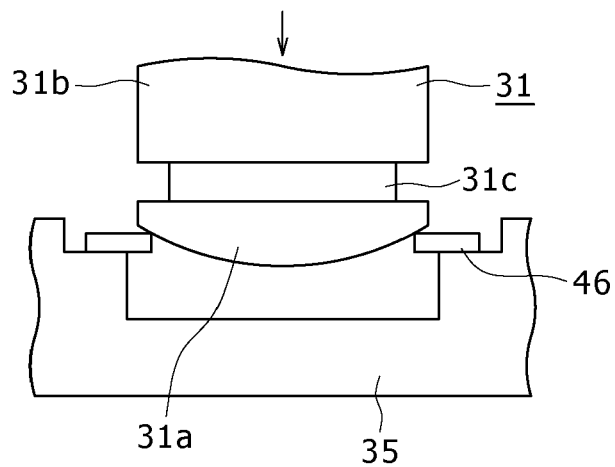
FIGS. 7A, 7B and 7C are sectional views illustrating action of a coming out preventing member of the bearing unit of FIG. 5 upon attachment to a rotary shaft and particularly illustrating states before, during and after attachment of the coming out preventing member.
Figure 7B:
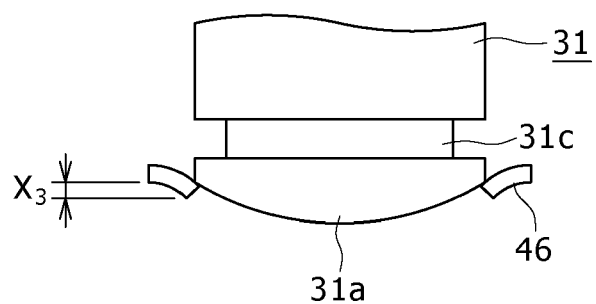
Figure 7C:
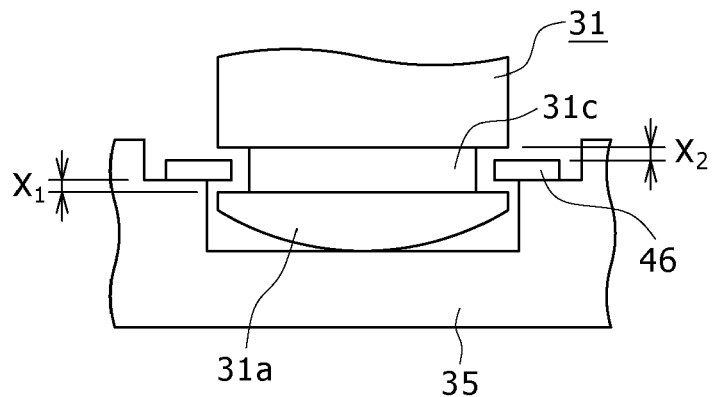

Here, action when the shaft coming out preventing member 46 is attached to the rotary shaft 31 is described. The rotary shaft 31 is pressed in a state wherein the shaft coming out preventing member 46 is disposed on the space forming member 35 in the housing 37 as seen in FIG. 7A until the shaft coming out preventing member 46 is resiliently deformed so as to be bent into an umbrella shape as seen in FIG. 7B. Then, the shaft coming out preventing member 46 restores its original shape at a point of time at which the rotary shaft 31 is inserted until the shaft coming out preventing member 46 comes to the position of the shaft coming out preventing grooved portion 31c thereby to attach the shaft coming out preventing member 46 to the shaft coming out preventing grooved portion 31c of the rotary shaft 31. Then, if the lower side gap X1 of the shaft coming out preventing member 46 described above is not set greater than a maximum deformation amount X3 illustrated in FIG. 7B, then attachment of the shaft coming out preventing member 46 to the rotary shaft 31 cannot be carried out appropriately, resulting in a problem of deterioration of the rotational performance or the like by no rotation or by abnormal rotation.

Since the shaft coming out preventing member 46 is formed from a resin material having a Young's modulus of a value equal to or higher than 3.4 GPa as described above, when compared with an alternative case wherein a resin material having a Young's modulus lower than 3.4 GPa is used, the maximum deformation amount X3 can be reduced. Besides, the shaft coming out preventing member 46 does not have a problem that it suffers from plastic deformation as in a case wherein a metal material is used. Therefore, such a shaft coming out preventing member 46 as described above can suppress the gap X1 to a low value and makes it possible to suppress the overall size of the shaft coming out preventing grooved portion 31c and the bearing unit 30 to allow miniaturization. Further, by setting the gap X1 between the lower end face of the shaft coming out preventing grooved portion 31c of the rotary shaft 31 and the lower end face of the shaft coming out preventing member 46 to a small dimension, movement of the rotary shaft 31 in the upward and downward directions can be reduced. Consequently, it is possible to prevent occurrence of such a situation that the rotary shaft 31 floats to lower the liquid level of the lubricating oil thereby to allow air to be admitted into the lubricating oil.

Here, an example of an experiment (hereinafter referred to as "shaft insertion possibility experiment example") regarding a relationship between the gap X1 of the shaft coming out preventing member which composes the bearing unit according to an embodiment of the present embodiment and whether or not the shaft can be inserted is described. In the shaft insertion possibility experiment example, a shaft coming out preventing member made of a resin material having a Young's modulus of 3.4 GPa as a comparative example and another shaft coming out preventing member made of the resin material of polyimide having the Young's modulus of 6.7 GPa described hereinabove as an example 1 of the present invention were used. In particular, for both of the shaft coming out preventing members, the rotary shaft was inserted with the gap X1 varied to decide whether or not it was able to insert the same. A result of the experiment is illustrated in Table 1 below. In Table 1, where insertion of the rotary shaft was possible, this is indicated by "○", but where such insertion was impossible, this is indicated by "x". It is to be noted that, in regard to the shape, dimension and so forth, the same conditions were applied to both of the shaft coming out preventing members.

TABLE 1

| | Gap X1 (mm) between lower end portion of shaft coming out preventing groove portion and lower end portion of shaft coming out member | | | | |
|---|---|---|---|---|---|
| | 0.2 | 0.23 | 0.25 | 0.27 | 0.28 |
| 3.4 GPa | x | x | o | o | o |
| 6.7 GPa | x | o | o | o | o |

As seen from the experiment result of Table 1, with the shaft coming out preventing member of the comparative example, where the gap X1 is smaller than 0.27 mm, insertion of the rotary shaft is impossible. Meanwhile, with the shaft coming out preventing member of the inventive example 1, since the Young's modulus is 6.7 GPa, where the gap X1 is equal to or greater than 0.23 mm, insertion of the rotary shaft is possible. From this result, it is confirmed that, since the shaft coming out preventing member which composes the bearing unit to which the present invention is applied is formed from a resin material having a high Young's modulus, it is possible to suppress the overall size of the coming out preventing groove portion and the bearing unit thereby to allow miniaturization and, by reducing the gap X1 between the lower end face of the coming out preventing groove portion and the lower end face of the shaft coming out member, it is possible to reduce the movement amount of the rotary shaft in the upward and downward directions. That it is possible to reduce the amount of movement of the rotary shaft in the upward and downward directions makes it possible to prevent such a situation that, due to floating of the rotary shaft, the liquid level of lubricating oil drops and air mixes into the lubricating oil.

Further, since the shaft coming out preventing member 46 which composes the bearing unit 30 to which the present embodiment is applied is made of a resin material having a high Young's modulus, if the thickness is equal, then it is possible to raise the strength (hereinafter referred to as "pulling out preventing force") in preventing the rotary shaft 31 from coming out due to the high Young's modulus and improve the impact withstanding property of the entire bearing unit 30. Further, if it is tried to obtain coming out preventing force equal to that of a coming out preventing member in the past having a low Young's modulus, then the thickness of the coming out preventing member can be reduced, and consequently, the overall dimension of the bearing unit in the axial direction can be reduced and miniaturization can be achieved. In particular, if the thickness of the shaft coming out preventing member is excessively great, then it is necessary to increase the gap for accommodating the coming out preventing member. Thus, by raising the physical property of the Young's modulus, the coming out preventing force or coming out withstanding force can be raised while the thickness of the coming out preventing member is suppressed.

Further, the shaft coming out preventing member which composes the bearing unit 30 to which the present embodiment is applied may have a lamination structure having two or more layers. Here, description is given of a shaft coming out preventing member 56 as another example of the shaft coming out preventing member which can be used in the bearing unit 30 to which the present embodiment is applied in place of the shaft coming out preventing member 46 described hereinabove.

Figure 8:
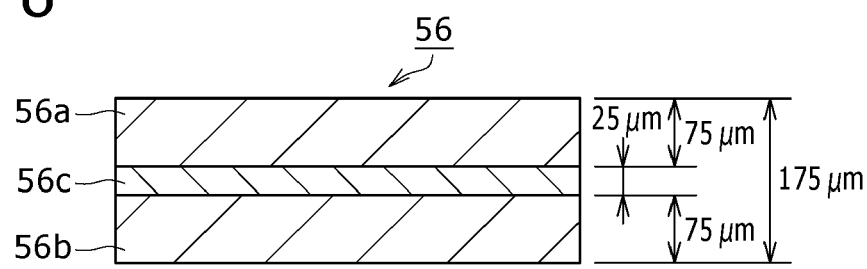
FIG. 8 is a sectional view showing part of the bearing unit of FIG. 5 wherein the coming out preventing member is formed with a laminated structure.

The shaft coming out preventing member 56 has a lamination structure having two or more layers each formed from a resin material having a Young's modulus equal to or higher than 4.1 GPa. The resin materials may be any of those which can be applied to the shaft coming out preventing member 46 described hereinabove. The shaft coming out preventing member 56 may include, for example, as seen in FIG. 8, a first layer 56a and a second layer 56b each having a thickness of 7.5 μm and both made of a resin material having a Young's modulus of 4.1 GPa and an adhesive layer 56c having a thickness of 25 μm and formed between the first layer 56a and the second layer 56b to adhere the first layer 56a and the second layer 56b to each other. The shaft coming out preventing member 56 configured in such a manner as just described exhibits substantially similar effects to those of the shaft coming out preventing member 46 described hereinabove from the high Young's modulus thereof. Further, since the shaft coming out preventing member 56 has a high degree of freedom in the thickness thereof due to the lamination structure thereof, the coming out preventing strength can be improved efficiently by laminating thin materials without depending upon a thick material. Thus, for example, even if only a comparatively thin material is available as a general purpose part, a shaft coming out preventing member of a desired thickness can be formed by laminating such parts, and reduction in cost can be achieved thereby.

Since the shaft coming out preventing member 56 which composes the bearing unit 30 to which the present embodiment is applied is made of a resin material having a high Young's modulus, if the thickness is equal, then it is possible to raise the strength (hereinafter referred to as "pulling out preventing force") in preventing the rotary shaft 31 from coming out due to the high Young's modulus and improve the impact withstanding property of the entire bearing unit 30. Further, if it is tried to obtain coming out preventing force equal to that of a coming out preventing member in the past having a low Young's modulus, then the thickness of the coming out preventing member can be reduced, and consequently, the overall dimension of the bearing unit in the axial direction can be reduced and miniaturization can be achieved.

Here, an example of an experiment (hereinafter referred to as "shaft pulling out force experiment example) regarding a relationship between the Young's modulus and the pulling out force of the shaft conducted using the shaft coming out preventing member 46 formed from a single layer and the shaft coming out preventing member 56 formed from two layers as a shaft coming out preventing member which composes the bearing unit to which the present embodiment is applied is described. In the shaft pulling out experiment example, a shaft coming out preventing member made of a resin material having a Young's modulus of 3.4 GPa and having a thickness of 0.125 mm as a comparative example and another shaft coming out preventing member of a two-layer lamination structure made of the resin material of polyimide having the Young's modulus of 6.7 GPa described hereinabove and having a thickness of 0.175 mm as an example 2 of the present embodiment were used. In particular, for both of the shaft coming out preventing members, predetermined pulling out force was applied in the same conditions to make an experiment to decide the frequency wherein the rotary shaft came out. A result of the experiment is illustrated in the form of a frequency distribution in FIG. 9. It is to be noted that, in the coming out preventing member in the inventive example 2 used, each of the first and second layers has a thickness of 0.075 mm and the adhesive layer has another thickness of 0.025 mm.

Here, for example, if the weight of the shaft of the bearing unit or the rotary portion attached to the housing is 30 g and an impact of 50 G is applied, then the impact force is approximately 15 N (1.5 kg). Thus, if a general safety factor is 7, then pulling force withstanding force of 105 N or more is demanded.

Figure 9:
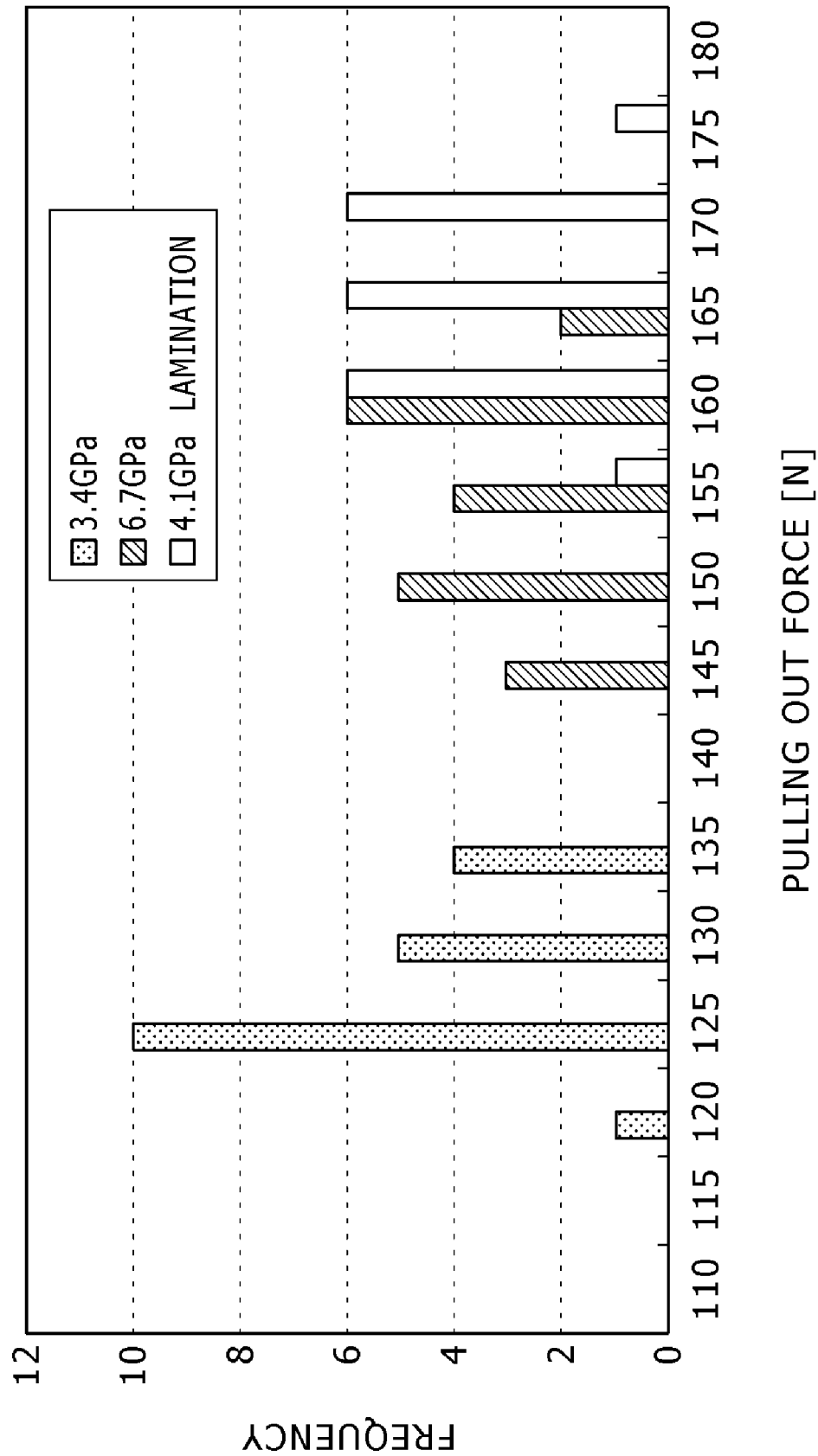
FIG. 9 is a graph illustrating a result of a shaft pulling out force experiment conducted for the coming out preventing member of the bearing unit of FIG. 5.
Figure 10:
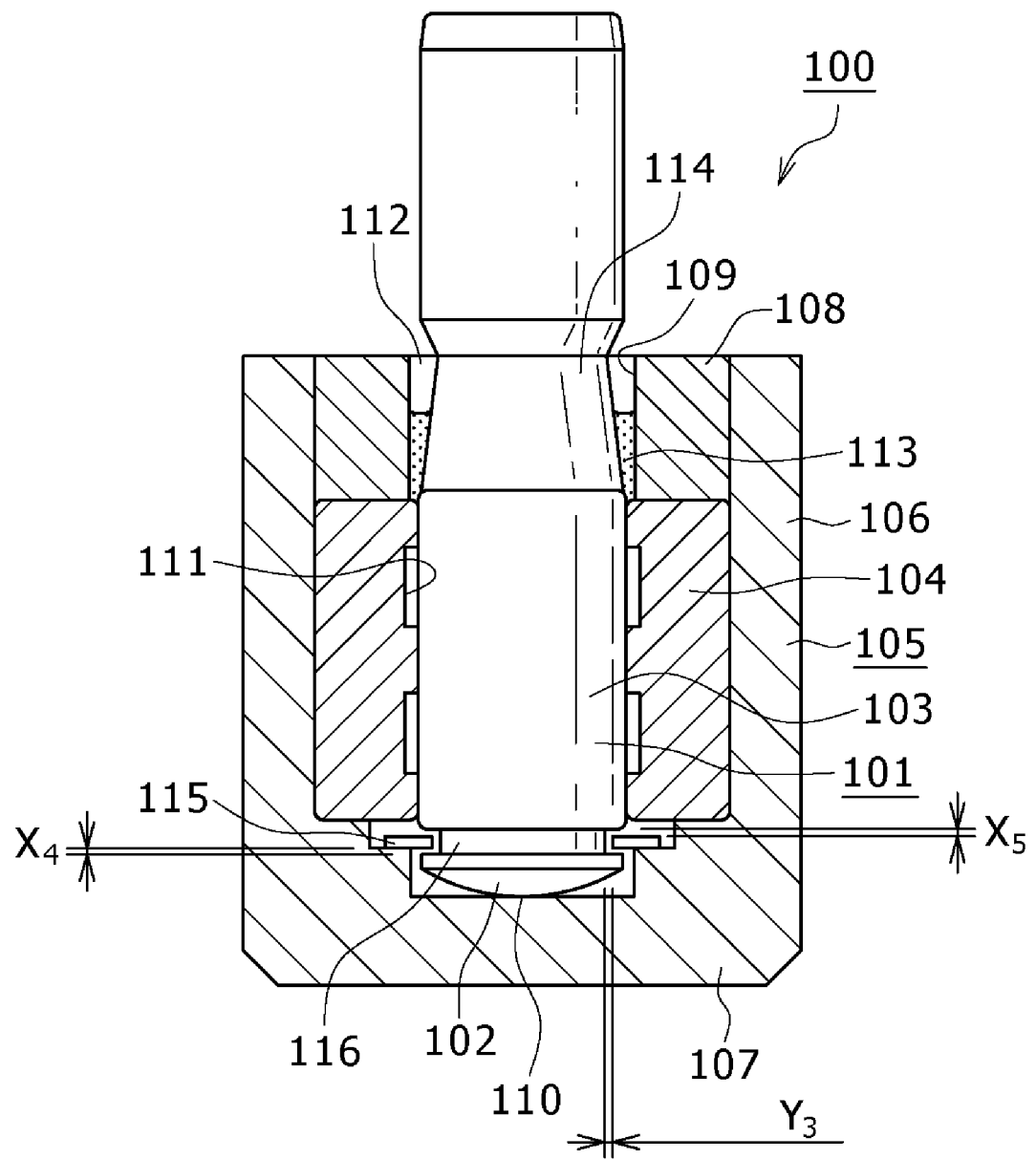
FIG. 10 is a sectional view showing a bearing unit used in the past.

As seen from the experiment result of FIG. 9, with the shaft coming out preventing member of the comparative example, the shaft came out in a considerably high frequency even in the proximity of 105 N demanded as the coming out withstanding force or coming out preventing force. In contrast, with the shaft coming out preventing members of the inventive examples 1 and 2, coming out of the shaft was not observed until the pulling out force increased to 140 N. From the results, it was confirmed that, since the shaft coming out preventing member which composes the bearing unit according to the present embodiment is formed from a single layer or a plurality of layers of a resin material having a high Young's modulus, it has increased coming out preventing force, by which the function of preventing coming out of the shaft can be improved and the impact withstanding property of the entire bearing unit can be improved. More particularly, it was confirmed that, where the coming out preventing member had a substantially same size, the pulling out withstanding force was improved successfully by approximately 20%.

With the shaft coming out preventing members 46 and 56 configured in such a manner as described above, since they have a high Young's modulus, the shaft coming out preventing force can be increased in a state wherein the thickness of the coming out preventing member itself is suppressed. Besides, since the Young's modulus is increased, the necessity to increase the size of the gap, into which the shaft coming out preventing member should be accommodated and which is demanded upon insertion of the shaft, from that in an alternative case wherein the shaft coming out preventing member has a low Young's modulus is eliminated. In other words, it becomes unnecessary to form the gap in a very great size. Consequently, the overall dimension of the bearing unit in the axial direction can be reduced thereby to achieve miniaturization.

While the bearing units described above include a housing formed from a molded part of a synthetic resin material, the material of the housing is not limited to the synthetic resin material, but a synthetic resin material having a metal material mixed therein or some other molding material which allows molding using a metal mold apparatus may be used. Or, for example, the upper closed section and the body may be formed from a metal material as separate members which are integrated by fusion or the like.

In summary, the bearing unit 30 includes a rotary shaft 31, a radial bearing 33, a thrust bearing 34, a housing 37, lubricating oil 38 as viscous fluid, and a coming out preventing member 46 or 56 provided on one end side of the radial bearing 33 at which the thrust bearing 34 is provided for engaging, when the rotary shaft 31 is moved in an axial direction, with a shaft coming out preventing groove portion 31c of the rotary shaft 31 to prevent the rotary shaft 31 from coming out from the radial bearing 33. The coming out preventing member 46 or 56 is made of a resin material having a value of a Young's modulus equal to or higher than 3.4 GPa. Consequently, where the coming out preventing member has a same size, the pulling out withstanding force or coming out preventing force can be improved by approximately 20%. Further, also the gap X1 between the lower end face of the shaft coming out preventing groove portion 31c and the lower end face of the coming out preventing member 46 or 56 can be reduced, and the amount of movement of the rotary shaft 31 in the upward and downward directions can be reduced.

Further, with the bearing unit 30 to which the present embodiment is applied, since the coming out preventing member 46 or 56 for preventing the shaft from coming out is formed from a resin material having a Young's modulus of a value equal to or higher than 3.4 GPa, the coming out preventing force is improved to improve the impact withstanding property. Further, the size, in the axial direction, of the grooved portion 31c of the rotary shaft 31 for disposing the coming out preventing member can be suppressed to implement miniaturization. Further, the gap X1 between the end face of the grooved portion 31c of the rotary shaft 31 and an end face of the coming out preventing member 46 can be reduced to implement reduction of the movement of the shaft in the upward and downward directions. Further, since the bearing unit 30 makes it possible to reduce the gap X1, it is possible to prevent occurrence of such a problem that the rotary shaft 31 floats to lower the liquid level of lubricating oil thereby to allow air to be admitted into the lubricating oil. Consequently, a good rotational performance can be assured for a long period of time.

The bearing unit to which the present embodiment is applied can be used not only as a bearing for a spindle motor of a radiator apparatus or a disk drive but also as a bearing for various motors.

Further, the bearing unit to which the present embodiment is applied can be applied not only to motors but also widely to various mechanisms which include a rotary shaft or mechanisms which support a part which rotates with respect to a shaft.

While a preferred embodiment of the present invention has been described using specific terms, such description is for illustrative purpose only, and it is to be understood that changes and variations may be made without departing from the spirit or scope of the following claims.

What is claimed is:

1. A bearing unit, comprising:
   a shaft;
   a radial bearing configured to support said shaft in a circumferential direction;
   a thrust bearing configured to support one end of said shaft in a thrust direction;
   a housing having said radial bearing and said thrust bearing disposed in the inside and having a closed structure except a shaft insertion hole into which said shaft is fitted;
   a coming out preventing member provided on one end side of said radial bearing at which said thrust bearing is provided configured to prevent said shaft from coming out from said radial bearing; and
   viscous fluid filled in said housing,
   wherein
      said coming out preventing member has a lamination structure of two or more layers each having a Young's modulus equal to or higher than 4.1 GPa, and
      the lamination structure of the coming out preventing member comprises a first layer and a second layer each having a thickness of 7.5 µm and made of a resin material having a Young's modulus of 4.1 GPa, and an adhesive layer having a thickness of 25 µm and formed between the first layer and the second layer to adhere the first layer and the second layer to each other.

2. The bearing unit according to claim 1, wherein said coming out preventing member is made of polyimide or polyetheretherketone.

3. The bearing unit according to claim 1, wherein the coming out preventing member is made of polyimide having a Young's modulus of 6.7 GPa.

4. The bearing unit according to claim 1, further comprising a plurality of pairs of V-shaped grooves formed in a circumferential direction on an inner circumferential face of the radial bearing.

5. The bearing unit according to claim 1, further comprising a plurality of grooves formed in herring-bone shape arrangement on an inner circumferential face of the radial bearing such that the plurality of grooves are connected to each other by a connecting groove in a circumferential direction.

6. A motor, comprising:
a stator;
a rotor; and
a bearing unit configured to support said rotor for rotation on said stator;
said bearing unit including
a shaft,
a radial bearing configured to support said shaft in a circumferential direction,
a thrust bearing configured to support one end of said shaft in a thrust direction,
a housing having said radial bearing and said thrust bearing disposed in the inside and having a closed structure except a shaft insertion hole into which said shaft is fitted,
a coming out preventing member provided on one end side of said radial bearing at which said thrust bearing is provided configured to prevent said shaft from coming out from said radial bearing, and
viscous fluid filled in said housing,
wherein,
said coming out preventing member has a lamination structure of two or more layers each having a Young's modulus equal to or higher than 4.1 GPa, and
the lamination structure of the coming out preventing member comprises a first layer and a second layer each having a thickness of 7.5 μm and made of a resin material having a Young's modulus of 4.1 GPa, and an adhesive layer having a thickness of 25 μm and formed between the first layer and the second layer to adhere the first layer and the second layer to each other.

7. The motor according to claim 6, wherein said coming out preventing member is made of polyimide or polyetheretherketone.

8. The motor according to claim 6, wherein the coming out preventing member is made of polyimide having a Young's modulus of 6.7 GPa.

9. The motor according to claim 6, wherein the bearing unit further comprises a plurality of pairs of V-shaped grooves formed in a circumferential direction on an inner circumferential face of the radial bearing.

10. The motor according to claim 6, wherein the bearing unit further comprises a plurality of grooves formed in herring-bone shape arrangement on an inner circumferential face of the radial bearing such that the plurality of grooves are connected to each other by a connecting groove in a circumferential direction.

11. An electronic apparatus, comprising:
a motor including a stator, a rotor, and a bearing unit configured to support said rotor for rotation on said stator;
said bearing unit including
a shaft,
a radial bearing configured to support said shaft in a circumferential direction,
a thrust bearing configured to support one end of said shaft in a thrust direction,
a housing having said radial bearing and said thrust bearing disposed in the inside and having a closed structure except a shaft insertion hole into which said shaft is fitted,
a coming out preventing member provided on one end side of said radial bearing at which said thrust bearing is provided configured to prevent said shaft from coming out from said radial bearing, and
viscous fluid filled in said housing,
wherein,
said coming out preventing member has a lamination structure of two or more layers each having a Young's modulus equal to or higher than 4.1 GPa, and
the lamination structure of the coming out preventing member comprises a first layer and a second layer each having a thickness of 7.5 μm and made of a resin material having a Young's modulus of 4.1 GPa, and an adhesive layer having a thickness of 25 μm and formed between the first layer and the second layer to adhere the first layer and the second layer to each other.

12. The apparatus according to claim 11, wherein said coming out preventing member is made of polyimide or polyetheretherketone.

13. The apparatus according to claim 11, wherein the coming out preventing member is made of polyimide having a Young's modulus of 6.7 GPa.

14. The apparatus according to claim 11, wherein the bearing unit further comprises a plurality of pairs of V-shaped grooves formed in a circumferential direction on an inner circumferential face of the radial bearing.

15. The apparatus according to claim 11, wherein the bearing unit further comprises a plurality of grooves formed in herring-bone shape arrangement on an inner circumferential face of the radial bearing such that the plurality of grooves are connected to each other by a connecting groove in a circumferential direction.

* * * * *